Figure 1:
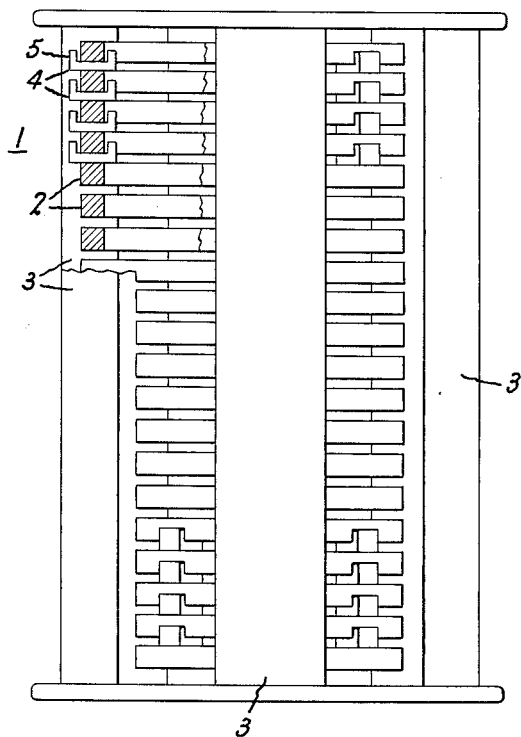

Feb. 14, 1956  J. L. THOMASON  2,735,075
SUPPORT MEMBERS FOR END TURNS OF ELECTRICAL COILS
Filed July 27, 1951  3 Sheets-Sheet 1

Inventor:
Jesse L. Thomason,
by Ernest H. Britton
His Attorney.

Feb. 14, 1956 J. L. THOMASON 2,735,075
SUPPORT MEMBERS FOR END TURNS OF ELECTRICAL COILS
Filed July 27, 1951 3 Sheets-Sheet 2

Inventor:
Jesse L. Thomason,
by Ernest␣ Britton
His Attorney.

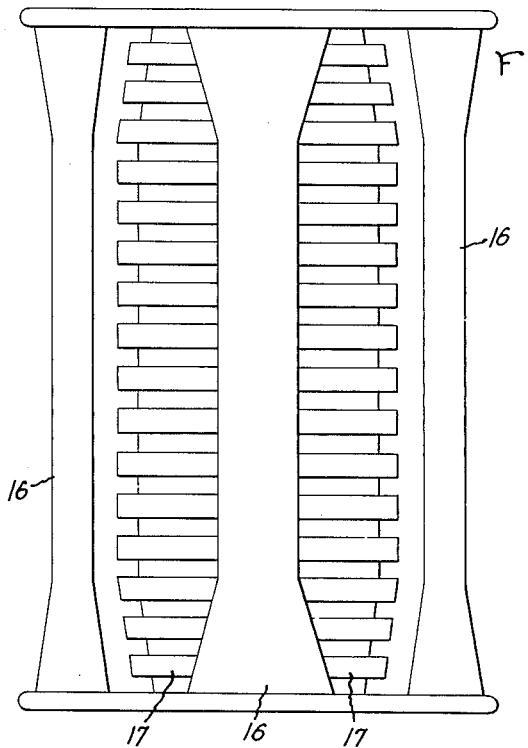
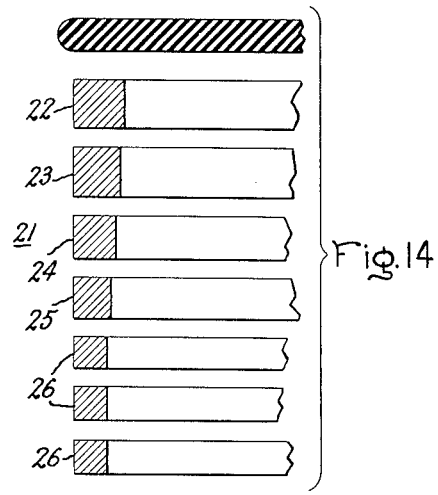
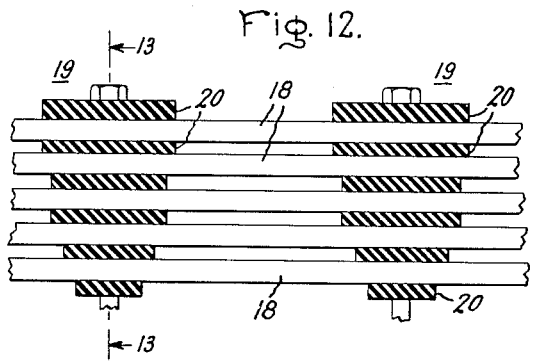
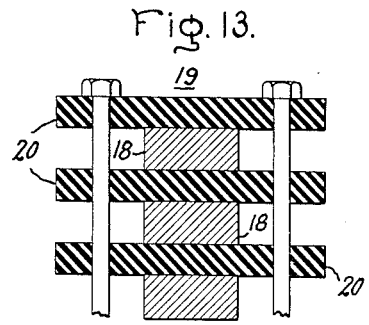
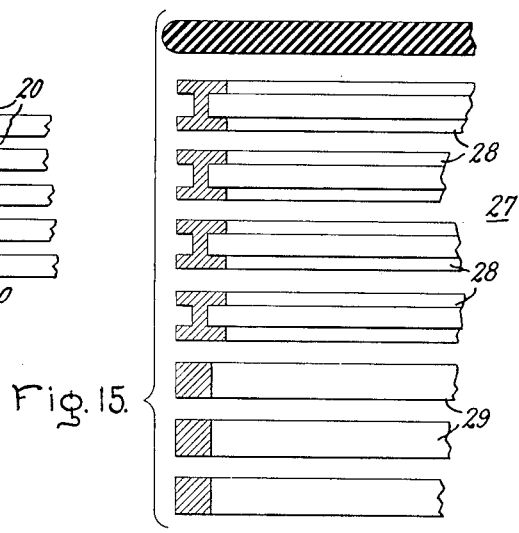
Inventor:
Jesse L. Thomason,
by Ernest C. Britton
His Attorney.

United States Patent Office 2,735,075
Patented Feb. 14, 1956

2,735,075

SUPPORT MEMBERS FOR END TURNS OF ELECTRICAL COILS

Jesse L. Thomason, Lenox, Mass., assignor to General Electric Company, a corporation of New York Application July 27, 1951, Serial No. 238,886

8 Claims. (Cl. 336—60)

This invention relates to stationary electrical induction apparatus and more particularly to means for preventing axial and radial distortion of the end turns of electrical windings due to the influence of strong magnetic fields.

While not limited thereto, my invention has particular application to relatively high voltage air core reactors of the type which are provided with a plurality of axially extending support members displaced from one another around the periphery of the reactor winding, with unsupported conductor spans extending between successive axially extending support members.

Electrical windings or coils for stationary electrical induction apparatus, such as transformer windings, induction coils, and reactor coils may be divided into the two broad categories of compactly wound windings and openly wound windings. By compactly wound is means that the electrical conductor is surrounded with a solid insulation, such as cellulose or rubber products, and that successive turns and layers are compactly laid one upon another so that only the solid insulation on the conductor or other interleaved solid insulation separates adjacent turns and layers of the conductor. By openly wound is meant that there are open spaces between successive turns and layers of the conductor so that a fluid, such as air, or oil, can flow through the open spaces between the conductors and thereby perform an insulating or cooling function. Windings or coils are usually wound openly for one or more of several reasons, such as (1) to insulate better; (2) to dissipate heat better; (3) to give better accessibility and for making taps; (4) to save material; (5) to save labor. Openly wound coils or windings may be of various types, such as spirally wound, single radially extending layer, or multi-layer, cylindrical, or polygonal-shaped.

This invention relates to support members for the end turns of openly wound coils or windings.

In the construction and operation of openly wound electrical windings, particularly those used in large size stationary electrical induction apparatus, such as large transformers and reactors, a problem which causes much difficulty is that of preventing distortion and destruction of electrical conductors due to strong magnetic fields surrounding the electrical winding, particularly under short circuit conditions. This problem is particularly noticeable in connection with openly wound windings of the type in which axially extending support members are spaced at points around the periphery of the winding, with unsupported conductor spans extending between successive support members. Experience has shown that the unsupported portion of the coil circumference or perimeter is subject to distortion by strong magnetic fields, often resulting in collapse and displacement of the conductor members. For an isolated toroidal coil, the magnetic flux lines assume generally circular shapes and pass through the center of the coil and around the outside, placing a compressive force on the outside conductor layers. Also, the flux lines in the center of the coil repel each other and place a bursting force on the coil.

It can be shown that in coils of the type having a plurality of conductor turns or layers extending in an axial direction that the maximum tendency to distortion occurs at the axially endmost turns or layers of the coil. The amount of distortion on any given turn or coil layer is proportional to its distance from the transverse center of the winding with the distortion decreasing to zero on the turns on the transverse axis of the winding.

Consider an openly wound generally cylindrical coil having only a single conductor layer extending in a radial direction, but a plurality of conductor turns or layers extending in an axial direction. Such a coil might be used as an air immersed reactor, and have supports extending for the entire axial length of the coil and displaced from one another circumferentially or perimetrically of the coil at regular intervals to hold the turns at a relatively fixed diameter, the axially extending supports also maintaining the turns spaced uniformly apart from each other in the axial direction.

When the magnetic force is increased until distortion is evident, the first evidence of distortion of the conductor occurs generally at the axially endmost conductor turns where the unsupported spans between supports are deflected or tend to collapse in an axial direction toward the transverse center of the coil.

Next, consider a multilayer openly wound cylindrical coil such as is used in an air immersed reactor in which there is a multiplicity of conductor layers in both a radial and an axial direction. In such a coil, conductor spans are conventionally unsupported except at various peripherally displaced points where supports extending for the entire axial length of the coil hold the conductor turns at relatively fixed diameters, and also maintain the turns uniformly spaced apart from each other in the axial direction.

When a coil of the type just described having a plurality of conductor layers in both a radial and an axial direction is excited and the magnetic force is increased until distortion is evident in the conductor, the probable sequence of collapse would be somewhat as follows: (1) the outside conductor of the end layer would deflect axially toward the transverse center of the coil; (2) then the second, third, etc. conductors from the outer periphery of the end layer would follow the axial deflection of the outside conductor of the end layer; (3) then the outside conductor of the end layer would deflect radially toward the axial center of the coil; and (4) the inside conductor of the end layer would deflect axially toward the transverse center of the coil.

In the manufacture of air core reactors of the type having a plurality of displaced axially extending supports, with unsupported conductor spans between supports, the prior art means for overcoming distortion of end conductor turns may be summarized as follows:

(1) Conductors for the entire reactor winding have been increased to a size which provides the necessary mechanical strength in the conductor required to prevent distortion of the end turns.

(2) Axially extending supports have been placed closer together.

It can be seen that reactors built in accordance with either categories (1) or (2) just enumerated require more material and are consequently more expensive to manufacture. Both of these prior art methods of overcoming end-turn distortion have the defect that they alter the characteristics of the entire reactor to remedy a situation which is confined to a localized region of the reactor, namely, the region of the end turns or layers.

It is an object of this invention to provide a new and improved type of support arrangement to prevent or retard distortion of the axially endmost turns or layers of openly wound electrical windings under the influence of strong magnetic fields.

In accordance with these objectives, this invention provides means for localized reinforcement of the end turns or layers of an electrical winding to prevent distortion of the end turns or layers. In one embodiment of my invention, I provide radially-extending support members between superposed end turns, positioned intermediately of the conductor spans between adjacent axially extending winding supports. In a second embodiment of my invention, I provide axially extending support members which are specially contoured in the region of the end turns or layers in such manner as to provide reinforcement for the end turns or layers; in a third embodiment of my invention I provide end turn conductors having greater structural strength than conductors in the intermediate portion of the winding.

Figure 2:
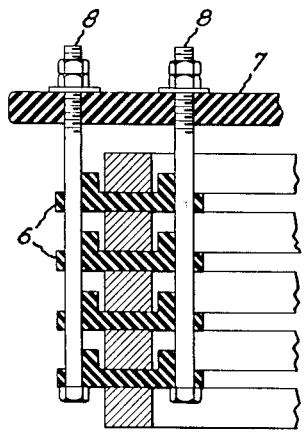
Figure 3:
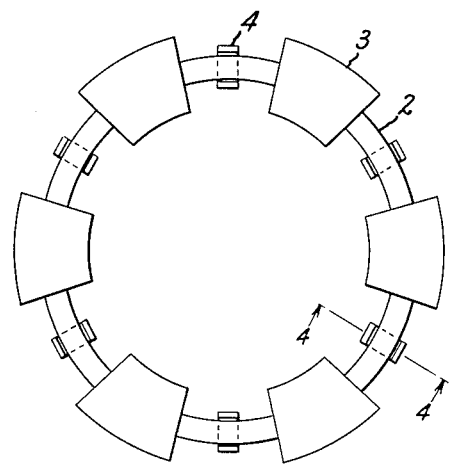
Figure 4:
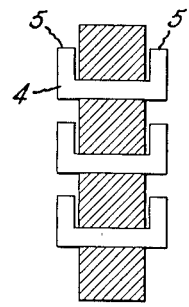
Figure 5:
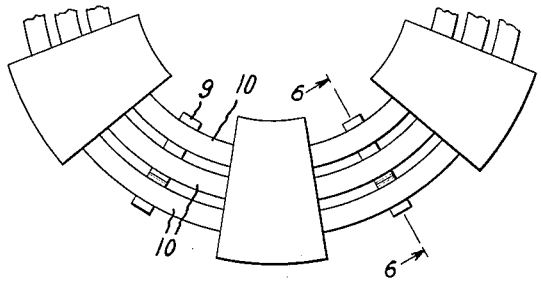
Figure 6:
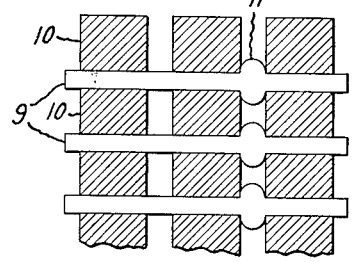
Figure 7:
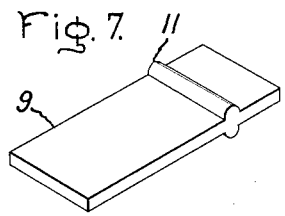
Figure 8:
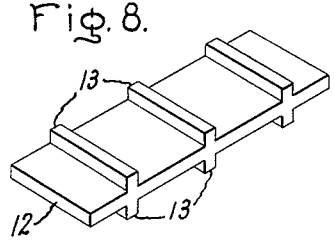
Figure 9:
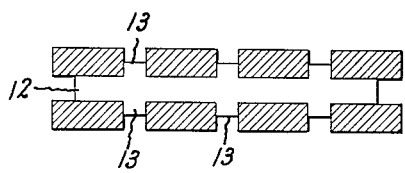
Figure 10:
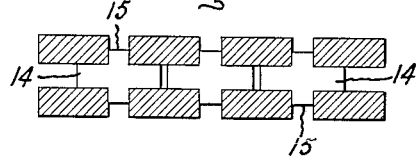

The features of this invention which I believe to be novel are set forth with particularity in the appended claims. My invention itself, however, both as to its organization and use, together with further objects and advantages thereof, may best be understood by reference to the following description taken in connection with the accompanying drawing in which Fig. 1 represents a front elevation view of a stationary electrical induction apparatus embodying end turn support members in accordance with my invention; Fig. 2 is a cut-away view in cross section of a modified embodiment using stud members to hold the end turn support members together; Fig. 3 is a plan view of the structure of Fig. 1 with cover or end plate removed; Fig. 4 is a sectional view of the coil and end layer support structure of Figs. 1 and 2 taken along line 4—4 of Fig. 3; Fig. 5 shows the use of a modified type of end layer support member in accordance with my invention for use with a coil structure having a plurality of radially extending conductor turns in each coil layer; Fig. 6 is a cross-sectional view of the coil and end layer support structure of Fig. 5 taken along the section line 6—6 of Fig. 5; Fig. 7 is a perspective view of an end layer support member of the type used in the construction of Figs. 5 and 6; Fig. 8 is a modified type of end layer support member for use with a coil of the type shown in Fig. 5, and having a plurality of rib members to separate adjacent conductor members in the same layer; Fig. 9 is a sectional view showing the relation of the conductors to the end layer support member, where the end layer support member is of the type shown in Fig. 8; Fig. 10 shows the relation of the conductors to a modified form of end layer support member which is basically the same as that shown in Figs. 8 and 9, except that the spacer member is divided into sections instead of being one integral piece; Fig. 11 is an elevation view of a winding having contoured axially extending supports in accordance with my invention; Fig. 12 is a view of a modified type of contoured axially extending support; Fig. 13 is a sectional view along line 13—13 of Fig. 12; Fig. 14 is a view of a modified embodiment of my invention in which the axially endmost conductor turns are of greater cross-sectional area than intermediately positioned turns; while Fig. 15 is a view of a winding having end turns which are I-shaped in cross section.

There is shown in Fig. 1 an elevation view of an openly wound stationary electrical induction device, in this case a reactor coil 1, having end layer support members in accordance with my invention. The coil 1 shown in this particular embodiment comprises a plurality of conductor layers 2 extending in an axial direction, with only a single conductor layer extending in a radial direction. The coil 1 is supported at spaced intervals around its periphery by axially extending stationary support members 3. The support members 3 extend for the entire axial length of the coil structure and are spaced apart at intervals around the periphery of the coil structure. The support members 3 may be cast solid of any suitable insulating material such as concrete or resin having the necessary structural strength, and are suitably apertured to provide passageways for the conductor layers. Alternatively, the axially extending support members 3 may be formed of cast, molded, or fabricated separators which are bolted together.

In accordance with my invention, radially extending end layer support members 4 are positioned between several of the respective pairs of layers at the upper and lower ends of the winding. End layer support members 4 are positioned intermediately of adjacent axially extending support members 3. The end layer support members 4 shown in the embodiment of Fig. 1 are adapted to support a coil of the type having only one turn for each layer, and are each preferably provided with a pair of upstanding ear or projection members 5. If desired, the support members 4 may be flat, with the ear or projection members 5 omitted.

The thickness of the end turn support member axially of the coil may be made of such value as to cause it to have a tight fit with respect to the coil layers between which it is positioned. This tight fit, plus the spring action of the conductors, and the loading due to magnetic forces, will normally be sufficient to clamp the support members in an axial direction without the use of additional positive clamping means.

However, in the modified embodiment shown in the cut-away view of Fig. 2, the plurality of end layer support members 6 between any given pair of axially extending support members may be rigidly attached to some stationary member, such as cover or end plate member 7. In this embodiment, the end layer support members 6 are provided at their radially outer and inner ends with apertured extensions through which stud members 8 may pass, the stud members also being attached to end plate 7, or to other available anchors. Each of the stud members 8 may be provided with a nut or nuts which serve to hold the end turn suport members 6 and stud members 8 rigid with respect to cover 7. By connecting stud members 8 to the end plate 7, the distorting magnetic forces are transmitted to the end plate anchor. If desired, the stud members may be used only to position the end turn support members, and to help distribute forces between the conductor turns which the stud member spans, in which case the stud members are not anchored to the casing. In an alternative arrangement, the end turn support members may be attached by a suitable bracket arrangement to axial support members 3.

Fig. 3 is a plan view of the coil and coil support structure of Fig. 1, with the cover 7 removed, and Fig. 4 is a sectional view of several of the end turns taken along line 4—4 of Fig. 3, showing the support members 4 in position.

There is shown in Figs. 5 and 6 a modified type of end layer support member 9 adapted for use with coils of the type having more than one conductor turn extending in a radial direction. As will best be seen in Fig. 6, the end layer support members 9 extend underneath each of the respective coil layers 10 for substantially the greater part of the radial width of the respective coils, lying under each of the respective conductor members in each layer. In order to resist radial thrust of the outermost turn of each layer toward the axis of the coil, and also to help maintain the end layer support members in position with respect to the conductor turns, each of the end layer support members 9 is provided with a rib member 11 extending above and below the main surface of the end layer support member. The rib 11 fits between the radially inner surface of the outermost turn in each layer and the radially outer surface of the conductor turn adjacent the radially outermost turn. The radially extending portion of the spacer prevents or resists deformation of the conductors in an axial direction. A perspective view of the end layer support member 9 is shown in Fig. 7.

There is shown in Fig. 8 a modified end layer support member in accordance with my invention which is particularly adapted for use with coils of the type having a plurality of conductor turns extending in a radial direction and in which excessive radial forces are present. Fig. 9 shows the spacer member of Fig. 8 positioned between two coil layers. The end layer support member 12 of Figs. 8 and 9 uses rib members 13 to separate each of the adjacent conductor turns in the same layer, rather than only using a rib member between the outermost turn and its adjacent turn. Rib or projection members 13 extend above and below the radially extending surface of the support member 12 and resist radial thrust of each of the conductor turns rather than only that of the outermost conductor turn, the ribs 13 also serving to maintain the end layer support member in position with respect to the conductor turns. The respective rib members 13 which project above and below the main body surface of the support member 12 fit between the respective adjacent conductor members above and below the surface of a given support member 12. However, the height of the respective projections 13 above and below the surface of the support member 12 are such that these projections do not extend from the main body of the respective support members for the full height of a given conductor layer but for only approximately half the height of each conductor layer. Thus, as shown in Fig. 9, any given pair of conductors in a given layer are separated by a projection from an end layer support member below the given layer and also by a projection from an end layer support member above the given layer.

There is shown in Fig. 10 a modified construction which is basically like that of Figs. 8 and 9 except that each support member separates only one pair of conductors in each layer. The plurality of support members 14 between any given pair of layers of a coil are equivalent to the single support member 12 shown in Figs. 8 and 9. In other words, to produce the support member 14 of Fig. 10, the support member 12 of Figs. 8 and 9 has been divided into a plurality of radially extending portions, instead of having the support member extend for the entire radial width of the coil. Each of the support members 14 shown in Fig. 9 is of cruciform cross section and has a projection 15 extending above and below the main surface of the individual support member. The main body surface of the support member extending in a radial direction fits between adjacent coil layers, while the axially extending projections 15 extend above and below the radially extending surface of the main body of the support member and between the adjacent conductor turns.

End turn support members in accordance with my invention may be positioned in different ways with respect to one another. As shown in the arrangement of Fig. 1, they may all be positioned along the center line of the span between successive axially extending support members 3, or on either side or on both sides of the center line between successive axially extending support members 3. The end turn support members between successive axially extending support members may also be positioned in a keystone bridging arrangement in accordance with which the support members 4 form an inverted V pattern.

End layer support members constructed in accordance with my invention may be formed of any suitable insulating material, the particular insulating material used depending upon the temperature conditions to which the apparatus is subjected. For example, the end layer support members may be made of porcelain, glass, concrete, asbestos, or a high temperature resinous compound. Because the stresses to which the support members are subjected may be high, it may be desirable to incorporate materials which would impart a degree of flexibility to the support members, such as fiber glass or asbestos fibers.

In a modified form of my invention, shown in Fig. 11, I provide supports for the end turns or layers of a winding by the use of specially contoured axially extending support members, which combine in one structure the functions of the axially extending support members and radially extending support members used in connection with the embodiments of my invention heretofore described.

In accordance with my invention, the solid axially extending support members 16 of Fig. 11 extend further peripherally of the winding in the region of the end layers of the winding than in the region of the intermediately positioned layers. Thus, the axially extending support members 16 taper from a portion of greater width peripherally of the winding adjacent the end turns or layers of the winding, to a portion of lesser width, peripherally of the winding, adjacent the axially intermediate layers or turns of the winding. The axially extending support members are suitably apertured to provide passageways for the conductors 17.

The principle of contoured supports may also be used where the axially extending supports are each comprised of a plurality of plates which are bolted or otherwise suitably held together. As shown in Fig. 12, the winding 18 is provided with a plurality of axially extending support members 19, each of which comprises a plurality of plate members 20 fitting between successive layers of the winding, each group of superposed plate members being bolted together or otherwise held at various degrees of rigidity with respect to one another. In order to provide additional support for the axially endmost layers of the winding, the plates between the axially endmost turns are made wider peripherally of the winding than support plates adjacent the axially intermediate turns of the winding. A sectional view along line 13—13 of Fig. 12 is shown in Fig. 13.

In both the arrangements of Figs. 11 and 12, the contoured support arrangement provides additional support for the end turns and layers of the winding by extending further along the winding periphery in the region of the end turns or layers. It should be noted that the increased width of the axial supports in the region of the end turns or layers usually does not impair the cooling of the winding in this region, since ordinarily the cooling requirements of the end turns are less than those of the layers which are positioned intermediately of the winding axis due to the fact that at the ends of the winding there is less restriction to the flow of the cooling medium.

In additional modifications of my invention, shown in Figs. 14 and 15, the structural strength necessary to permit the end turns to resist deformation may be provided by making the conductors of the end turns or layers of greater cross-sectional area, or by forming the end turn conductors of a shape having greater structural strength. As shown in Fig. 14, the conductor turns 22, 23, 24, 25 for the end layers of coil 21 have a greater cross-sectional area than the turns 26 of the intermediate layers. In Fig. 15 there is shown a coil 27 in which the conductors 28 of the end turns or layers are given a shape known to have greater structural strength. In this case, the conductors 28 have an I-shape cross section which has high structural strength for a given cross-sectional area. The intermediate conductor turns 29 are made of conventional rectangular or circular cross section.

It can be seen that my invention provides new arrangements for providing reinforcement for the end turns and layers of an electrical coil, particularly for reactors of the type having peripherally displaced, axially extending support members. My invention provides localized reinforcement in the end turn region, thereby achieving an economy in manufacturing over prior constructions in which the entire winding and support structure were generally manufactured to the same specifications as the winding and support arrangement in the end turn region.

While there have been shown and described particular embodiments of my invention, it will be obvious to those skilled in the art that various changes and modifications may be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a stationary electrical induction apparatus having an openly wound electrical winding comprising a plurality of spaced axially superposed conductor layers arranged about a common axis, a plurality of axially extending support members supporting said layers and positioned at peripherally displaced points of said winding and extending axially for substantially the entire axial length of said winding, the conductor layers located in the transverse central region of the winding being unsupported throughout that portion of their length which extends circumferentially between said axially extending support members, and radially extending support members for providing support against axial and radial displacement of a plurality of the axially endmost of said conductor layers, said radially extending support members being positioned intermediately of successive axially extending support members, each respective radially extending support member being positioned between a pair of axially endmost layers of said winding.

2. In combination, a stationary electrical induction apparatus having an openly wound electrical winding comprising a plurality of spaced axially superposed conductor layers arranged about a common axis, a plurality of axially extending support members supporting said layers and positioned at peripherally displaced points of said winding and extending axially for substantially the entire axial length of said winding, the conductor layers located in the transverse central region of the winding being unsupported throughout that portion of their length which extends circumferentially between said axially extending support members, and radially extending support members for providing support against axial displacement of a plurality of the axially endmost of said conductor layers, said radially extending support members being positioned intermediately of successive axially extending support members, each respective radially extending support member being positioned between a pair of axially endmost layers of said winding, said radially extending support members being provided with rib-like projections.

3. In combination, a stationary electrical induction apparatus having an openly wound electrical winding comprising a plurality of spaced axially superposed conductor layers arranged about a common axis, a plurality of axially extending support members positioned at peripherally displaced points of said winding and extending axially for substantially the entire axial length of said winding, the conductor layers located in the transverse central region of the winding being unsupported throughout that portion of their length which extends circumferentially between said axially extending support members, said axially extending support members being recessed to receive substantially all of the turns of said winding, and a plurality of radially extending support members for supporting the axially endmost of said conductor layers, said radially extending support members being positioned intermediately of successive axially extending support members, each respective radially extending support member being positioned between a pair of axially endmost layers of said winding.

4. In combination, a stationary electrical induction apparatus having an openly wound electrical winding comprising a plurality of spaced axially superposed conductor layers arranged about a common axis, a plurality of axially extending support members positioned at peripherally displaced points of said winding and extending axially for substantially the entire axial length of said winding, the conductor layers located in the transverse central region of the winding being unsupported throughout that portion of their length which extends circumferentially between said axially extending support members, said axially extending support members being recessed to receive substantially all of the turns of said winding, and a plurality of radially extending support members for supporting the axially endmost of said conductor layers, said radially extending support members being positioned intermediately of successive axially extending support members, each respective radially extending support member being positioned between a pair of axially endmost layers of said winding, said radially extending support members being provided with rib-like projections for resisting radial displacement of conductor turns adjacent said respective radially extending support members.

5. In combination, an openly wound electrical winding of the type comprising a plurality of spaced superposed conductor layers arranged about a common axis, a plurality of axially extending support members supporting said layers and extending for substantially the entire axial length of said winding, said axially extending support members being displaced from one another about the periphery of said winding, the conductor layers located in the transverse central region of the winding being unsupported throughout that portion of their length which extends circumferentially between said axially extending support members, additional support members for providing support against axial displacement of a plurality of the axially endmost conductor layers, said additional support members being positioned intermediately of adjacent axially extending support members, each of said additional support members comprising a radially extending portion upon which conductors for a given layer rest, and at least one axially extending portion integral with said radially extending portion, said axially extending spacer portion being interposed immediately adjacent the radially innermost surface of the outermost conductor turn of a layer adjacent said respective additional spacer member.

6. In combination, an openly wound electrical winding of the type comprising a plurality of spaced superposed conductor layers arranged about a common axis, each of said layers having a plurality of radially extending conductor turns, a plurality of axially extending support members supporting said layers and extending for substantially the entire axial length of said winding, said axially extending support members being displaced from one another about the periphery of said winding, the conductor layers located in the transverse central region of the winding being unsupported throughout that portion of their length which extends circumferentially between said axially extending support members, additional support members for providing support against axial and radial displacement of a plurality of the axially endmost conductor layers, said additional support members being positioned intermediately of adjacent axially extending support members, each of said additional support members comprising a radially extending portion upon which conductors for a given layer rest, and a plurality of rib-like axially extending portions integral with said radially extending portion, each of said axially extending portions being interposed between a pair of radially adjacent turns in a conductor layer adjacent said support member.

7. In combination, an openly wound electrical winding of the type comprising a plurality of spaced superposed conductor layers arranged about a common axis, each of said layers comprising a single conductor turn, a plurality of axially extending support members supporting said layers and extending for substantially the entire axial length of said winding, said axially extending support members being displaced from one another about the periphery of said winding, the conductor layers located in the transverse central region of the winding being unsupported throughout that portion of their length which extends circumferentially between said axially extending support members, additional support members for providing support against axial and radial displacement of the axially endmost of said conductor turns, said additional support members being positioned intermediately of adjacent axially extending support members, each of said spacer members comprising a portion of generally U-shape having a radially extending portion upon which the conductor turn for one of said endmost layers rests and two axially extending portions comprising the legs of said U-shaped member, said radially extending portion resisting axial deformation of said conductor turns.

8. In combination, an openly wound electrical winding of the type comprising a plurality of spaced superposed conductor layers arranged about a common axis, each of said layers having a plurality of radially extending conductor turns, a plurality of axially extending support members supporting said layers and extending for substantially the entire axial length of said winding and displaced from one another peripherally of said winding, the conductor layers located in the transverse central region of the winding being unsupported throughout that portion of their length which extends circumferentially between said axially extending support members, spacer members positioned intermediately of adjacent axially extending support members for providing support against axial and radial displacement of the axially endmost of said conductor turns, each of said spacer members comprising a radially extending spacer portion adapted to be positioned between a pair of adjacent axially endmost layers of said winding and to span the space between a pair of radially adjacent conductor turns of each of said axially adjacent layers, and a pair of axially extending projections integrally connected to each of said radially extending spacer portions and extending in opposite directions therefrom, said axially extending portions being adapted to be respectively interposed between the radially adjacent conductor turns in each pair of conductor turns spanned by said radially extending spacer portion.

References Cited in the file of this patent

UNITED STATES PATENTS

| | | |
|---|---|---|
| 1,224,225 | Sieber | May 1, 1917 |
| 1,747,953 | Roothaan | Feb. 18, 1930 |
| 1,813,994 | George | July 14, 1931 |
| 2,372,950 | Holmberg | Apr. 3, 1945 |